US00RE34870E

United States Patent [19]

Cummins et al.

[11] E Patent Number: Re. 34,870

[45] Reissued Date of Patent: Mar. 7, 1995

[54] ELECTRO-MECHANICAL ACTUATOR

[75] Inventors: Richard D. Cummins; Franklin G. Miller, both of Orchard Park, N.Y.

[73] Assignee: Moog Inc., East Aurora, N.Y.

[21] Appl. No.: 847,293

[22] Filed: Mar. 6, 1992

Related U.S. Patent Documents

Reissue of:

[64] Patent No.: 4,641,072
Issued: Feb. 3, 1987
Appl. No.: 756,079
Filed: Jul. 17, 1985

U.S. Applications:

[63] Continuation-in-part of Ser. No. 537,109, Sep. 29, 1983, abandoned.

[30] Foreign Application Priority Data

| | | | |
|---|---|---|---|
| Aug. 3, 1982 | [JP] | Japan | 57-140911 |
| Nov. 4, 1982 | [GB] | United Kingdom | 8231509 |
| Nov. 9, 1982 | [DE] | Germany | 32 41 254.1 |
| Nov. 16, 1982 | [FR] | France | 82 19146 |

[51] Int. Cl.[6] ..... G05B 11/00; H02K 41/02

[52] U.S. Cl. ..... 318/687; 318/135; 310/12; 335/234; 335/253

[58] Field of Search ..... 318/687, 135, 686; 310/12, 36; 335/229, 230, 234, 236, 253–255

[56] References Cited

U.S. PATENT DOCUMENTS

| | | | |
|---|---|---|---|
| 3,259,810 | 7/1956 | Williams | 335/234 |
| 3,514,674 | 5/1970 | Ito | 335/234 X |
| 3,538,359 | 11/1970 | Barowski | 310/36 X |
| 3,571,633 | 3/1971 | Timmerman | 310/36 X |
| 3,728,654 | 4/1973 | Tada | 335/254 X |
| 4,127,835 | 11/1978 | Knutson | 310/30 X |
| 4,329,672 | 5/1982 | Stahl | 310/36 X |
| 4,346,318 | 8/1982 | Shtrikman | 310/12 |

*Primary Examiner*—Jonathan Wysocki
*Attorney, Agent, or Firm*—Sommer, Oliverio & Sommer

[57] ABSTRACT

An electro-mechanical actuator has a ferrous alloy armature movably mounted within a body chamber. Two axially-spaced permanent magnets are arranged radially inwardly of the chamber and partially define the chamber at the ends thereof. A coil surrounds the chamber. The body is formed of a magnetically-permeable material. Because of the high reluctance of the magnets, each magnet forms a short magnetic loop which passes through the adjacent air gap, and forms a long magnetic loop which encircles the coil and passes through the distant air gap. The armature has a bistable toggle-like movement, and may be latched proximate either end wall. If springs are added between the armature and the body, the improved actuator may be used as a proportional position of force transducer within an operating range of armature movement.

9 Claims, 3 Drawing Sheets

Fig. 6.
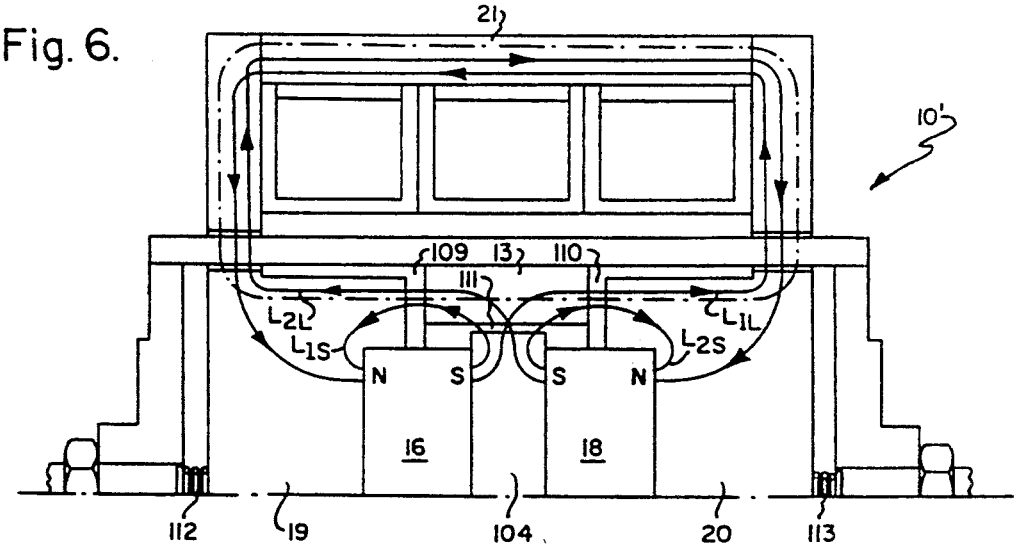
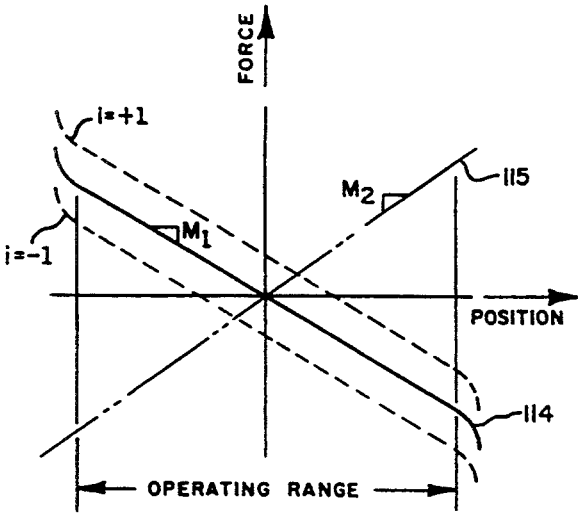
Fig. 7.
$M_2 = -M_1$
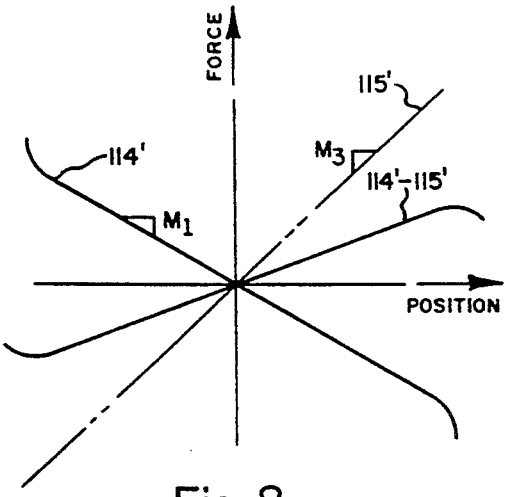
Fig. 8.
$M_3 > -M_1$
Fig. 9.
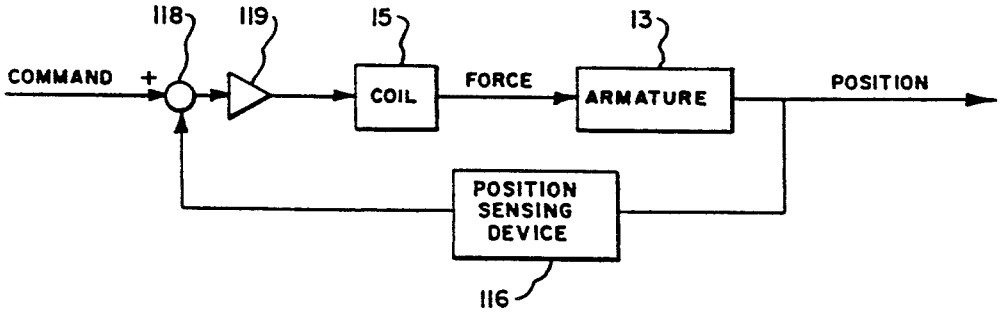

ELECTRO-MECHANICAL ACTUATOR

Matter enclosed in heavy brackets [ ] appears in the original patent but forms no part of this reissue specification; matter printed in italics indicates the additions made by reissue.

CROSS-REFERENCE TO RELATED APPLICATION[S]

This application is a continuation-in-part of pending U.S. patent application Ser. No. 06/537,109, filed Sep. 29, 1983, now abandoned[, which is a continuation-in-part of U.S. patent application Ser. No. 06/321,340, filed Nov. 6, 1981 and now abandoned].

BACKGROUND OF THE INVENTION

1. Field of the Invention

The present invention relates generally to the field of electro-mechanical actuators, and, more particularly, to an improved electro-mechanical actuator capable of being latched in its extreme positions, and also capable of proportional operation within an operating range.

2. Description of the Prior Art

Heretofore, others have developed various forms of electro-mechanical actuators and solenoids. Such earlier efforts are shown in one or more of the following U.S. Pat. Nos.: 2,735,045 (Savoie); 3,368,788 (Padula); 3,481,578 (Baldi); 3,502,105 (Ernyei et al.); 3,751,086 (Geringer); 3,814,376 (Reinicke); 3,859,547 (Massie); 3,886,507 (Johnston et al.); 4,203,571 (Ruchser); and 4,216,938 (Inada et al.). Of these, Reinicke interposed a permanent magnet between two energizable coils. A single magnet provided two magnetic loops, each encircling a coil. With respect to the magnetic circuits disclosed and claimed herein, British Pat. No. 1,008,735 (Hamilton et al.) and U.S. Pat. No. 4,127,835 (Knutson) may also be pertinent.

Rare earth magnets, such as those formed of samarium cobalt, have been developed in recent years. These magnets afford the capability of an intense field strength from a physically-smaller magnet. However, unlike most iron alloys, these new materials generally have a very high reluctance, or impermeability to passage of magnetic flux therethrough. Indeed, their permeability to flux passage is on the same order of magnitude as that of air. See, e.g., Yamada, "The Situation of Rare Earth-Cobalt Magnets in Japan", informiert, Th. Goldschmidt A.G., No. 48 (February 1979) [at 43, 44–46]. Hence, when position in a magnetic circuit, such rare earth magnets may, for practical purposes, be regarded as the equivalent of an air gap to passage of flux therethough. Other specific types of such rare earth magnets, and their properties and characteristics, are also listed in informert, supra.

As they have become available, others have heretofore employed such rare earth magnets in a variety of different devices. Examples of these earlier implementation schemes are shown in British Pat. No. 1,591,471 (Hart) and U.S. Pat. No. 4,144,514 (Rinde et al.), both of which disclose types of electro-mechanical actuators employing samarium cobalt magnets.

SUMMARY OF THE INVENTION

An improved electro-mechanical actuator includes: a body formed of a magnetically-permeable material and having an annular chamber therewithin, the body having an outer portion arranged radially outwardly of the chamber and having an inner portion arranged radially inwardly of the chamber, the body having an opening therethrough which communicates with the chamber, the body having first and second surfaces arranged in spaced facing relation to one another; and armature having one portion arranged within the chamber and having another portion penetrating the body opening, the armature having a first surface arranged to face the body first surface and having a second surface arranged to face the body second surface, any space between the body first surface and the armature first surface defining a first air gap and any space between the body second surface and the armature second surface defining a second air gap; suspension means arranged between the body and armature for operatively mounting the armature for movement between the first and second body surfaces; a coil mounted on the body and selectively operable to create a magnetic field in at least one flux path which passes through the first and second air gaps; and at least one permanent magnet mounted on the body, each magnet being operatively arranged to create through the body and armature a first magnetic loop passing through one of the air gaps but not the other of the air gaps and a second magnetic loop passing through the other air gap but not the one air gap.

In another aspect, the improved actuator comprises: a body formed of a magnetically-permeable material and having an annular chamber therewithin, this body having first and second surfaces arranged in spaced facing relation to one another; an annular armature having a magnetically-permeable portion arranged within the chamber for axial movement relative to the body, the armature having a first surface arranged to face the body first surface and having a second surface arranged to face the body second surface, any space between the body first surface and the armature first surface defining a first air gap and any space between the body second surface and the armature second surface defining a second air gap; at least one coil mounted on the body and surrounding the two air gaps, each coil being selectively energizable to create a magnetic field which passes through the first and second air gaps; and a pair of axially-spaced magnets arranged so as to have their like poles facing one another, mounted on the body and surrounded by the chamber and armature.

Accordingly, the general object of the invention is to provide an improved electro-mechanical actuator.

Another object is to provide an improved actuator in which an armature has a toggle-like action and may be latched in either of its extreme positions.

Another object is to provide an improved actuator in which the armature may, in response to an input coil current, be moved proportionally within an operating range of movement.

Another object is to provide an improved actuator which may be used as a force or position transducer.

These and other implicit objects and advantages will become apparent from the foregoing and ongoing written specification, the drawings, and the appended claims.

BRIEF DESCRIPTION OF THE DRAWINGS

FIG. 6 is a schematic vertical sectional view of a modified form of the improved actuator, which has been modified for proportional operation.

FIG. 7 is a graph of force on the armature (ordinate) versus armature position (abscissa), and illustrates that the net force exerted by the biasing springs may be selected to cancel the net magnetic force exerted on the armature.

FIG. 8 is a graph similar to the graph of FIG. 7, but illustrates a modification in which the biasing springs dominate the net magnetic force exerted on the armature.

FIG. 9 is a block diagram depicting the use of a position sensing device to provide a negative feedback signal.

DESCRIPTION OF THE PREFERRED EMBODIMENTS

Figure 2:
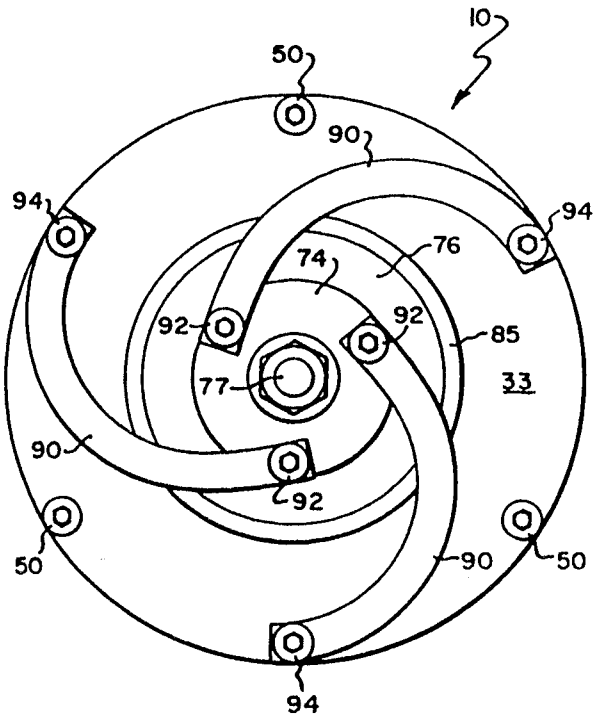
FIG. 2 is a reduced-scale fragmentary right end elevation thereof.

At the outset, it should be clearly understood that like reference numerals are intended to identify the same elements, portions and surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, etc.) together will the specification and are to be considered as a portion of the entire "written description" of this invention, as required by 35 U.S.C. 112§ As used in the following description, the terms "left", "right", "up" and "down", as well as adjectival and adverbial derivatives thereof (e.g., "leftwardly", "rightwardly", etc.), refer to the orientation of the illustrated structure as the particular drawing figure faces the reader, Similarly, the terms "inwardly" and "outwardly" refer to the orientation of a surface relative to its axis of elongation.

Figure 1:
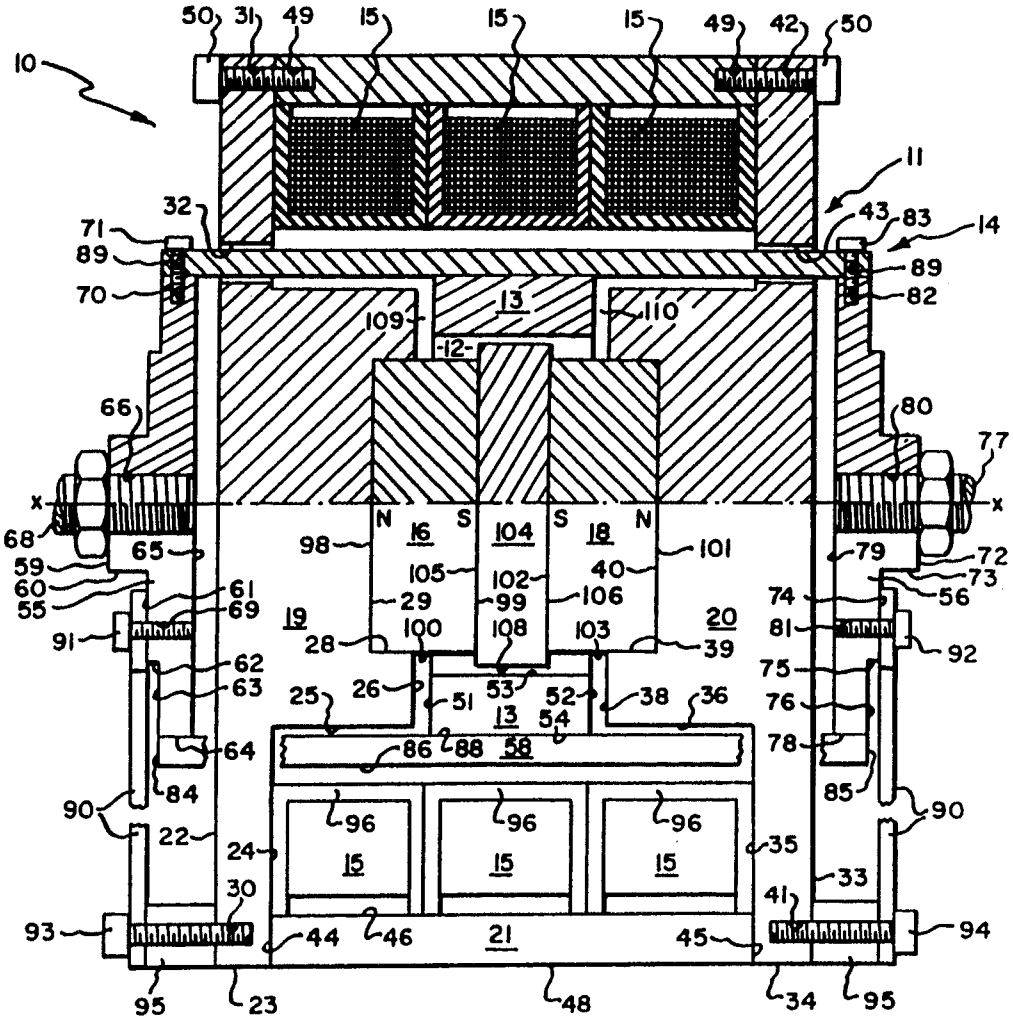
FIG. 1 is a fragmentary longitudinal vertical sectional view of the preferred embodiment of the improved electro-mechanical actuator.

Referring now to the drawings, and, more particularly, to FIGS. 1 and 2 thereof, this invention provides an improved electro-mechanical actuator, of which the presently-preferred embodiment is generally indicated at 10. This actuator is shown as broadly including: a body 11 elongated along a horizontal axis x—x and having a horizontally-elongated annular chamber 12 therewithin; an armature 13 arranged within this chamber for movement relative to the body; suspension means 14 mounting the armature for bi-directional axial movement relative to the body; three coils, severally indicated at 15, mounted on an outer portion of the body which is arranged radially outwardly of the chamber; and a pair of horizontally-spaced rare earth magnets 16, 18, preferably formed of samarium cobalt, mounted co-axially on an inner portion of the body which is arranged radially inwardly of the chamber. Thus, the three coils 15, 15, 15 encircle the armature, and the armature 13 encircles the magnets.

The body is shown as being of sectional construction and includes axially-spaced left and right parts 19, 20, and a ring-like outer member 21 therebetween. The body left part 19 is shown as being a specially-configured solid member, and is sequentially bounded by a leftwardly-facing circular vertical surface 22, a short outwardly-facing cylindrical outer surface 23 extending rightwardly therefrom, a rightwardly-facing annular vertical surface 24, an outwardly-facing cylindrical surface 25, a rightwardly-facing annular vertical surface 26, a short inwardly-facing cylindrical surface 28 extending leftwardly therefrom, and a rightwardly-facing vertical circular surface 29. Surface 28, 29 form a rightwardly-facing recess which extends into the body left part from its rightward surface 26. Six circularly-spaced holes extend rightwardly into the body left part 19 from its left surface 22 adjacent outer surface 23. Alternating holes, one of which is indicated at 30, are drilled blind and tapped. The other three intermediate holes, one of which is indicated at 31, are drilled through and communicate surface 22 with surface 24. The body left part is further provided with a plurality of arcuate segmented slots or holes, one of which is indicated at 32, extending between surfaces 22, 24 just outwardly of surface 25.

The body right part 20 is substantially a mirror image of body left part 19. Specifically, the body right part is sequentially bounded by a rightwardly-facing vertical circular surface 33, a short outwardly-facing cylindrical outer surface 34 extending leftwardly therefrom, a leftwardly-facing annular vertical surface 35, an outwardly-facing cylindrical surface 36 extending leftwardly therefrom, a leftwardly-facing annular vertical surface 38, a short inwardly-facing cylindrical surface 39 extending rightwardly therefrom, and a leftwardly-facing vertical surface 40. Surfaces 39, 40 form a leftwardly-facing recess which extends rightwardly into the body right part from its leftward surface 38. Six circularly-spaced holes extend leftwardly into the body right part 20 from its rightward surface 33 adjacent is outer surface 34. As with the body left part, every other hole, of which is indicated at 41, is drilled blind and tapped, while the other three alternating holes, one of which is indicated at 42, are drilled through and communicate surface 33 with surface 35. The body right part is also provided with a plurality of arcuate segmented slots or holes, one of which is indicated at 43, which extend between surfaces 33, 35 just outwardly of surface 36.

The ring-like outer member 21 is shown as being in the form of a horizontally-elongated thin-walled cylinder, and is bounded by a leftwardly-facing annular vertical surface 44 which abuts an outer marginal portion of the body left part surface 24, a rightwardly-facing annular vertical surface 45 which abuts an outer marginal portion of body right part surface 35, an inwardly-facing cylindrical surface 46, and an outwardly-facing cylindrical surface 48. Three circularly-spaced blind tapped holes, severally indicated at 49, extend horizontally into outer member 21 from each of its end faces. These holes are designed to receive fasteners 50 passing through holes 31 and 42, respectively, by which the left part-outer member-right part subassembly may be drawn together.

The armature 13 is shown as being a ring-like iron member having an annular vertical left face 51, an annular vertical right face 52, an inwardly-facing cylindrical inner surface 53, and an outwardly-facing cylindrical outer surface 54.

The suspension means 14 is shown as being of sectional construction, and includes left and right vertical end plates 55, 56, respectively, arranged outside the body and connected by an intermediate horizontally-elongated thin-walled tubular sleeve member 58 formed of a non-magnetic material. The left end plate 55 is a specially-configured annular member, and is sequentially bounded by a leftwardly-facing annular vertical surface 59, a short outwardly-facing cylindrical surface 60 extending rightwardly therefrom, a leftwardly-facing annular vertical surface 61, a short outwardly-facing cylindrical surface 62 extending rightwardly therefrom, a leftwardly-facing annular vertical surface 63, an outwardly-facing cylindrical surface 64 extending rightwardly therefrom, and a rightwardly-facing annular vertical surface 65. The left end plate is provided with an axial tapped through-hole 66, which extends between surfaces 59, 65, to receive and accommodate the threaded right marginal end portion of a rod 68, by which movement of the armature-suspension means assembly may be coupled or connected to other structure (not shown). The left end plate is shown as being further provided with three circularly-spaced horizontal tapped through-holes, severally indicated at 69, extending between surfaces 61, 65, and with a plurality of radial blind tapped holes, severally indicated at 70, which extend into the left end plate from its outer surface 64 to receive a corresponding plurality of fasteners, severally indicated at 71, by which the left end plate may be connected to sleeve member 58.

The right end plate 52 is a substantially mirror image of the left end plate, and is sequentially bounded by a rightwardly-facing annular vertical surface 72, a short outwardly-facing cylindrical surface 73 extending leftwardly therefrom, a rightwardly-facing annular vertical surface 74, a short outwardly-facing cylindrical surface 75 extending leftwardly therefrom, a rightwardly-facing annular vertical surface 76, an outwardly-facing cylindrical surface 78 extending leftwardly therefrom, and a leftwardly-facing annular vertical surface 79. The right end plate is provided with an axial tapped through-hole 80, which extends between surfaces 72, 79 to accommodate and receive the threaded left marginal end portion of another rod 77, by which movement of the armature assembly may be optionally coupled to other structure (not shown). The right end plate is further provided with three circularly-spaced tapped horizontal through-holes, severally indicated at 81, extending between surfaces 74, 79, and with a plurality of blind tapped radial holes, severally indicated at 82, to receive a corresponding plurality of fasteners, severally indicated at 83, by which the right end plate may be connected to sleeve member 58.

The sleeve member 58 is in the form of a horizontally-elongated thin-walled, non-magnetic cylinder having segmented end sections (not fully shown) provided with projecting portions which pass through openings 32, 43 to attach to end plates 55, 56, corresponding. Sleeve member 58 is bounded by left and right annular vertical end faces 84, 85, respectively, an outwardly-facing cylindrical surface 86, and an inwardly-facing cylindrical surface 88 having its left and right marginal end portions engaging end plate surfaces 64, 78, respectively. The marginal end portions of the sleeve are provided with pluralities of radical openings, severally indicated at 89, to permit passage of the shank portions of the fasteners 71, 83. As best shown in FIG. 1, the outer surface 54 of the armature is suitably secured to an intermediate portion of the sleeve member with surface 88.

The suspension means 14 is shown as further including six leaf springs, severally indicated at 90, which are shown as being strip-like members and which have a somewhat C-shaped outline when viewed in elevation (FIG. 2). Three of these springs are circularly-spaced and connect left end plate 55 to body left part 19, while the other three are also circularly-spaced and connect right end plate 56 to body right part 20. These springs are provided with holes through their inner and outer marginal end portions. The radially-inwardly marginal end portions of these springs engage end plate surfaces 61, 74, and are held in this position by fasteners 91, 92, received in the left and right body part tapped holes 69, 81, respectively. The radially-outward marginal end portions of these springss are secured to the body by means of fasteners 93, 94, received in body holes 30, 41 via intermediate collars 95, 95, respectively. Thus, the springs flexibly suspend the sleeve member and the armature on the body for limited movement in either axial direction relative thereto.

Each of the three coils 15, 15, 15 is an annular member mounted on the body and encircling the chamber and armature. Each coil is wound on an annular dielectric bobbin 96, which has a somewhat U-shaped appearance when viewed in transverse cross-section (FIG. 1). In this embodiment, three coils are provided to illustrate the ease with which the improved actuator may be adapted to triple-redundant operation. However, one, two, or any other number of coils, might be alternatively provided. Each coil is further separated from the armature by the presence of an radial air gap and non-magnetic sleeve member 58.

Both magnets 16, 18 are preferably formed of a high reluctance rare earth alloy, such as samarium cobalt, and, ideally, are equally dimensioned and are of equal strength. The left or first magnet 16 has a circular vertical left end face 98 engaging body surface 29, has an opposite circular vertical right end face 99, and has an outwardly-facing cylindrical surface 100. The left margin of magnet surface 100 engages body surface 28, while the right margin thereof is spaced from armature inner surface 53 by the presence of an intermediate radial air gap. Conversely, the right or second magnet 18 has a circular right end face 101 engaging body surface 40, an opposite circular vertical left end face 102, and an outwardly-facing cylindrical surface 103. The right margin of magnet surface 103 engages body surface 39, while the left margin thereof is spaced from armature surface 53 by the presence of an intermediate radial air gap.

As best shown in FIG. 1, a ferro-magnetic disk 104 is operatively arranged between the facing South (S) poles of magnets 16, 18, to hold them in the two body part recesses. Specifically, this intermediate disk has a circular vertical left end face 105 engaging left magnet right face 99, has a circular vertical right end face 106 engaging right magnet left face 102, and has an outwardly-facing cylindrical surface 108 spaced from armature surface 53 by a radial air gap. It should be noted that the length of this radial air gap between surfaces 108, 53 is substantially less than the length of the radial air gap between magnet surfaces 100, 103 and disk outer surface 108, so that the preferred path of flux passage will be through the smaller air gap.

The body (i.e., body left part 19, body right part 20, outer member 21 and disk 104), are formed of magnetically-permeable material, such as iron. The ring-like armature 13 is also formed of iron. However, the sleeve member 58, as well as the end gaps 55, 56, are preferably formed of a magnetically-impermeable material, such as aluminum or titanium, so as to minimize the possibility of flux jumping the other-than-intended air gaps. However, the end caps 55, 56 could be formed of a magnetically-permeable material if such structure were suitably dimensioned so as to increase the length of such other-than-intended air gaps. Thus, a left or first air gap 109 is defined between body first surface 26 and armature first surface 51, and a right or second air gap 110 is defined between body second surface 38 and armature second surface 52. The annular chamber 12 is formed within the body, and is sequentially bounded by the inwardly-facing cylindrical surfaces of the three coil bobbins 96, 96, 96; body left part surfaces 24, 25, 26; the exposed portion of left magnet outer surface 100; the exposed portions of intermediate disk surfaces 105, 106 and 109; the exposed portion of right magnet surface 103; and body right part surfaces 38, 36, and 35.

Figure 3:
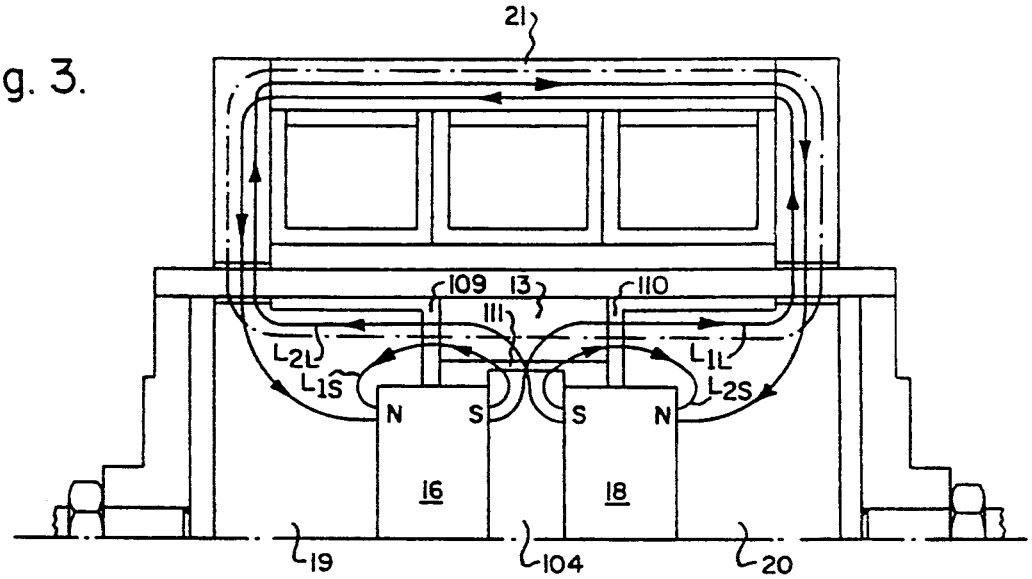
FIG. 3 is a reduced-scale schematic showing the outline of the various parts in the upper portion of the actuator shown in FIG. 1, this view showing the armature in a centered position relative to the body.

Referring now to FIG. 3, and assuming that the direction of flux travel is from the South pole (S) to the North pole (N), the leftward or first magnet 16 will create short and long magnetic loops $L_{1S}$, $L_{1L}$, both of counter-clockwise flux direction.

Flux issuing from the first magnet South pole (S) may return to the magnet's North pole (N) by passing through a short loop $L_{1S}$, which includes disk 104, the relatively-short constant-length radial air gap 111 between disk surface 108 and armature surface 53, armature 13, the variable-length first air gap 109, and body left part 19. At the same time, flux issuing from the first magnet's South pole may also return to the magnet's North pole by passing through a long loop $L_{1L}$, which includes disk 104, radial air gap 111, armature 13, the variable-length second air gap 110, body right part 20, body outer part 21, and body left part 19.

The rightward or second magnet 18 will also create similar short and long magnetic loops $L_{2S}$, $L_{2L}$, but these will be of clockwise flux direction. Thus, flux issuing from the second magnet South pole (S) may return to the second magnet North pole by passing through a short loop $L_{2S}$, which includes disk 104, radial air gap 111, armature 13, variable-length second air gap 110, and body right part 20. At the same time, flux issuing from the second magnet's South pole may return to that magnet's North face by passing through a long loop $L_{2L}$, which includes disk 104, radial air gap 111, armature 13, variable-length first air gap 109, body left part 19, body outer part 21, and body right part 20.

In this regard, it should be noted that while the combined aggregate length of the first and second air gaps 109, 110 is a constant, the relative lengths of these two air gaps vary reciprocally as the armature moves relative to the body, in the sense that as the length of one air gap decreases, the length of the other increases by a corresponding amount. Indeed, the only variable in each of the four magnetic loops is the length of the axial air gap 109 or 110 through which flux must pass. The length and area of radial air gap 111 will remain substantially constant as the armature moves axially relative to the body. The combined length of the first and second air gaps is substantially less than the axial length of either magnet. Hence, the majority of the magnet flux will take the path of least resistance and will pass through the air gaps, rather than pass through the distant magnet, which is of higher reluctance. It shall also be noted that because the two magnets are axially-spaced from one another, their respective short loops $L_{1S}$ and $L_{2S}$ do not interfere with one another. However, the long loops $L_{1L}$ and $L_{2L}$ must pass through common body outer part 21, and are series-bucking in that element, as well as in the body left and right parts. Hence, the flux as in these long loops, being of opposite direction, tends to cancel one another in these common body parts.

Thus, when the armature is centered between body surfaces 26, 38, as shown in FIG. 3, the first and second air gaps 109, 110 will be of equal length. If the magnets are equally dimensioned and of equal strength, then the flux density of $L_{1S}$ will be equal to the flux density of $L_{2S}$, while the flux densities of the two long loops will also be equal to one another. In this condition, the armature will remain in such centered position because there is no net force which urges it to move off-center.

The coil may be selectively energized to create a force which, which superimposed on the forces created by the magnets, biases the armature to move off-center. By varying the polarity and magnitude of the supplied current, the coil may be caused to produce a flux of the appropriate magnitude and direction. Such coil flux will pass through body outer part 21, body left part 19, first air gap 109, armature 13, second air gap 110, and body right part 20, as shown in FIG. 3. Thus, the majority of the coil flux will take the path of least resistance by jumping the first and second air gaps 109, 110, rather than by passing through the higher reluctance magnets.

Figure 4:
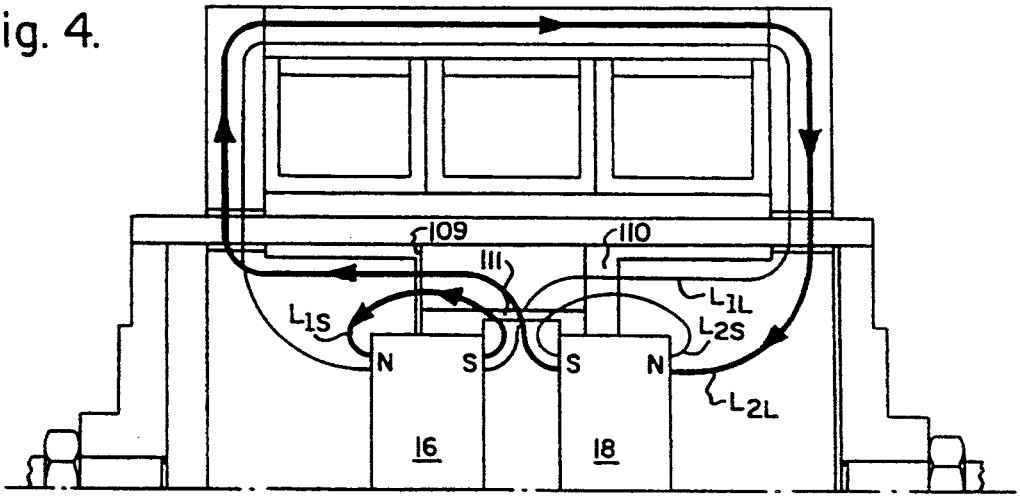
FIG. 4 is a view similar to FIG. 3, but showing the armature as having been shifted leftwardly from the centered position shown in FIG. 3, relative to the body.

FIG. 4 illustrates a situation in which the armature has been shifted leftwardly relative to the body such that left air gap 109 is shorter than right air gap 110. In this condition, the flux density in $L_{1S}$ will be greater than the flux density in $L_{2S}$ because of the respective reluctances of the proximate air gaps through which each must pass. This is indicated by the darkened and lightened lines in FIG. 4, which visually represent the magnitudes of the flux densities in $L_{1S}$ and $L_{2S}$. At the same time, the flux density in $L_{2S}$ will be greater than the flux density in $L_{1L}$ because of the respective reluctance in the distant air gaps through which each must pass. The dominance of $L_{2L}$ over $L_{1S}$ is again indicated by the darkened and lightened lines in FIG. 4. In this regard, it should also be noted that while the fluxes in $L_{1S}$ and $L_{2L}$ are of opposite direction, these two dominant fluxes are series-aiding as they pass through air gap 109, and therefore tend to reinforce one another. The significance of this is that as the armature moves leftwardly from the centered position shown in FIG. 3, the narrowing air gap 109 increases the flux density of these loops $L_{1S}$ and $L_{2L}$, which urge the armature to move leftwardly, while the lengthening air gap 110 decreases the flux density in those other loops $L_{2S}$ and $L_{1L}$, which urge the armature to move rightwardly. If there are no other forces acting on the armature, the armature will move leftwardly to close the first air gap, and will thereafter remain in this leftwardly-shifted latched condition. Of course, the coil may be selectively energized such that the coil flux (not shown in FIG. 4), of desired magnitude and direction, when superimposed on the magnet fluxes, will modify the net force acting on the armature.

Figure 5:
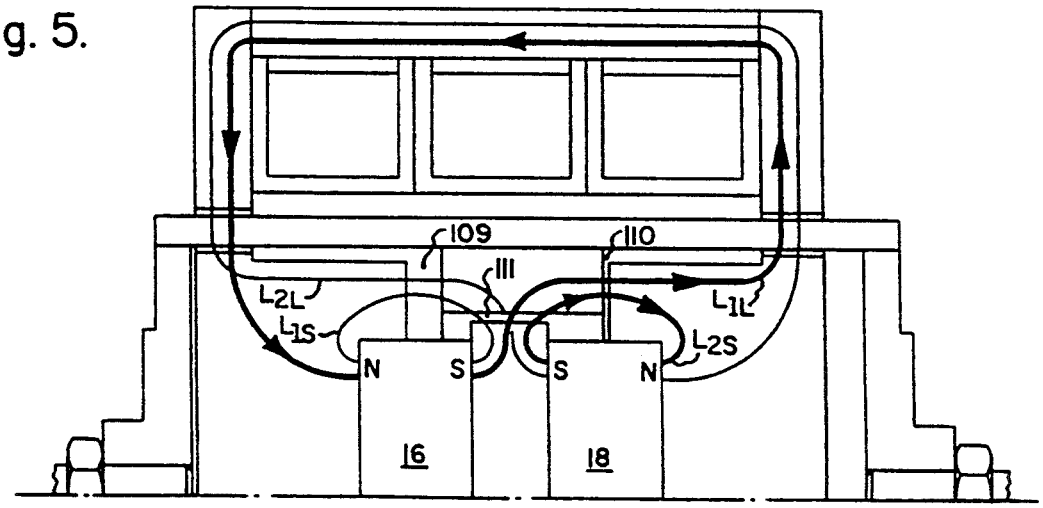
FIG. 5 is a view similar to FIG. 3, but showing the armature as having been shifted rightwardly from the centered position shown in FIG. 3, relative to the body.

FIG. 5 illustrates a converse situation wherein the armature has been shifted rightwardly from the centered position shown in FIG. 3, such that the rightward air gap 110 will be shorter than left air gap 109. In this condition, the flux densities in $L_{2S}$ and $L_{1L}$ will be increased because of the lowered reluctance of the now-narrowed second air gap 110, while the flux densities in $L_{1S}$ and $L_{2L}$ will be decreased because of the higher reluctance of the now-lengthened first air gap 109. Here again, while the fluxes in $L_{2S}$ and $L_{1L}$ are of opposite direction, such fluxes are series-aiding as they pass through second air gap 110, and therefore tend to reinforce one another. Thus, as the armature moves rightwardly from the centered position shown in FIG. 3, the narrowing air gap 110 will increase the flux density in those loops $L_{2S}$ and $L_{1L}$, which urge the armature to move rightwardly, while the lengthening air gap 109 will decrease the flux density in those other loops $L_{1S}$ and $L_{2L}$, which urge the armature to move rightwardly. The significance of this is that, in the absence of an overriding coil flux, the armature has a somewhat toggle-like snap action, with the force of attraction increasing as the armature moves off-center in either axial direction. This feature renders the improved actuator particularly suitable for "on-off" control, because the coil may be subsequently deenergized when the armature is in either "latched" condition, thereby eliminating an otherwise continuous power drain.

If desired, suitable non-magnetic buffers (not shown), such as O-rings or the like, may be positioned adjacent the chamber end walls to prevent physical contact of the armature end faces with such chamber end walls. By enforcing physical separation between the armature and the end walls, such buffers would reduce the amount of break-away force needed to displace the armature from a "latched" condition, at the expense of deliberately maintaining air gaps 109, 110 of some length.

Proportional Operation (FIGS. 6–9)

Whereas the armature of the first embodiment depicted in FIGS. 1–4 has a bistable toggle-like snap action, the inventive actuator may be readily modified for proportional operation, such that the actual position of the armature will be substantially a linear function of applied coil current.

To accomplish this, a modified actuator 10' shown in FIG. 6 has a pair of centering springs 112, 113 operatively interposed between the left and right end plates and the body, respectively. Specifically, left coil spring 112 is arranged to act between left end plate surface 65 and body left surface 22, while the right coil spring 113 is arranged to act between right end plate surface 79 and body right surface 33. As the armature moves axially relative to the body, one of the springs will be further compressed, while the other will expand. The type and position of these opposed armature-biasing springs is illustrative only, and may be readily modified by skilled designers. If desired, the flexure springs 90 may be increased in stiffness to provide this centering function.

Since a coil spring has a linear force (F)-to-displacement (x) relationship (i.e., $F=kx$, where $k$=spring stiffness or gradient) within an operating range, the spring(s) can be selected so as to either balance or dominate the net magnetic force acting on the armature. In FIG. 7, the force exerted on the armature (ordinate) is plotted against armature position (abscissa). The various magnetic loops will produce forces which urge the armature to move toward either latched position, as indicated by curve 114. It should be noted that curve 114 has an intermediate substantially linear portion of slope $M_1$ within an operating range of armature movement. If desired, the springs 112, 113 may be carefully selected such that their net effect will be to produce a line, indicated at 115 in FIG. 7, of opposite but substantially equal slope $M_2$. The slope of line 115 may be easily varied by selecting springs of the desired spring rate. Thus, the lines 114 and 115, when superimposed within the operating range, will effectively cancel one another, in the absence of a coil current, so that essentially zero net force will be exerted on the armature at any position of the armature within the operating range. FIG. 7 also depicts, in dashed lines, the aggregate magnetic forces upon application of a positive coil current ($i=+1$) and application of a negative coil current ($i=-1$). When either of these curves is superimposed on line 115, the result will be a horizontal line of some magnitude (either positive or negative). In this form, the force exerted on the armature will be proportional to the magnitude of the applied coil current at any position of the armature within its operating range of movement. This rate-cancellation feature allows the armature to operate as a force actuator.

Alternatively, springs 112, 113 could be purposefully selected so as to dominate the magnetic forces, as shown in FIG. 8. In other words, if stiffer springs were employed such that the slope ($M_3$) of line 115' would be greater in magnitude that the slope ($M_1$) of line 114', these two lines, when superimposed, would produce a line 114'–115' of positive slope within the operating range. In other words, the armature will be urged to move toward a position commanded by the coil current within the operating range. This would permit the improved actuator to function as a position actuator without the need for a feedback transducer.

As shown in FIG. 9, a suitable position sensing device 116, such as a potentiometer or a linear variable differential transformer (LVDT), may be used to sense the actual position of the armature, and to supply the electric analog of such sensed position as a feedback signal. The position sensing device 116 supplies a feedback signal to the summing point 118, and the algebraic difference of this and the electrical command signal is supplied as an error signal through an amplifier 119 to coil 15. The error signal causes a corrective force to be exerted on the armature. Ultimately, the armature reaches the commanded position, at which time the error signal is reduced to zero assuming there is no external load on the armature. In this condition, the armature will remain at the commanded position because no net force need be exerted on the armature within the operating range.

Thus, at least one spring may be operatively arranged to afford the capability of proportionally of either force or position as a function of input coil current within the operating range. In addition, the positioning capability of the actuator may be enhanced by the use of a position sensing transducer in a negative feedback servo loop. Although the actuator in FIG. 6 is shown as incorporating two coil springs to afford the capability of proportional operation, only one spring, such as a cantilever spring, need be provided if arranged so as to provide a bidirectional centering force gradient.

Modifications

The present invention contemplates that many modifications may be made. The particular materials of which the various body parts and components are formed is not deemed critical, and may be readily varied if consistent with their purpose and function. Although samarium cobalt has been cited as the preferred magnet material, other rare earth magnet alloys, or, indeed, still other magnet materials, may be substituted therefor if such alternate materials have sufficiently high reluctance. Similarly, the particular shape of the individual component body parts may be altered, modified or varied by a skilled designer. The various component parts may be made unitary or sectional, as desired. Thus, the invention broadly discloses an improved electro-mechanical actuator, which has a number of operational advantages. The actuator may be adapted to many possible uses, such as controlling the movement or displacement of a valve element relative to a seat or port. However, this possible use is illustrative only and should not be viewed as limiting the scope of the appended claims. The possible uses and applications for the improved actuator are widespread and varied.

Therefore, while the presently-preferred embodiment of the improved electro-mechanical actuator has been shown and described, and several possible modifications thereof discussed, persons skilled in this art will readily appreciate that various additional changes and modifications may be made without departing from the spirit of the invention, as defined and differentiated by the following claims.

What is claimed is:

1. An electro-mechanical actuator, comprising:

a body formed of a magnetically-permeable material and having an annular chamber therewithin, said body having an outer portion arranged radially outwardly of said chamber and having an inner portion arranged radially inwardly of said chamber, said body having an opening therethrough which communicates with said chamber, said body having first and second surfaces arranged in spaced facing relation to one another;

an annular armature having one magnetic portion arranged within said chamber and having another non-magnetic portion penetrating said body opening, said armature having a first surface arranged to face said body first surface and having a second surface arranged to face said body second surface, any space between said body first surface and said armature first surface defining a first air gap and any space between said body second surface and said armature second surface defining a second air gap;

suspension means arranged between said body and armature for mounting said armature for movement between said first and second body surfaces;

a coil mounted on said body and selectively operable to create a magnetic field in at least one flux path which passes through said first and second air gaps; and at least one permanent magnet mounted on said body, each magnet being operatively arranged to create through said body and armature a first magnetic loop passing through one of said air gaps but not the other of said air gaps and a second magnetic loop passing through said other air gap but not said one air gap.

2. An electro-mechanical actuator as set forth in claim 1 wherein the reluctance of each magnet is greater than the sum of the reluctances of said first and second air gaps.

3. An electro-mechanical actuator as set forth in claim 1 wherein the coil flux passes through said first and second air gaps.

4. An electro-mechanical actuator as set forth in claim 1 wherein a first magnet is mounted on said body inner part adjacent said first air gap and a second magnet is mounted on said body inner part adjacent said second air gap.

5. An electro-mechanical actuator as set forth in claim 4 wherein a surface of said first magnet faces into said chamber, and wherein a surface of said second magnet faces into said chamber.

6. An electro-mechanical actuator as set forth in claim 4 and further comprising a magnetically-permeable spacer arranged between said magnets.

7. An electro-mechanical actuator as set forth in claim 1 wherein said suspension means comprises a plurality of leaf springs engaging said armature and said body.

8. An electro-mechanical actuator, comprising:

a body formed of a magnetically-permeable material and having an annular chamber therewithin, said body having first and second surfaces arranged in spaced facing relation to one another;

an annular armature having a magnetically-permeable portion arranged within said chamber for axial movement relative to said body, said armature having a first surface arranged to face said body first surface and having a second surface arranged to face said body second surface, any space between said body first surface and said armature first surface defining a first air gap and any space between said body second surface and said armature second surface defining a second air gap;

at least one coil mounted on said body and surrounding said air gaps, each coil being selectively energizable to create a magnetic field in a flux path which passes through said first and second air gaps;

a first magnet mounted on said body and surrounded by said first air gap;

a second magnet mounted on said body and surrounded by said second air gap;

said first and second magnets being spaced axially apart and having their like poles arranged to face one another.

9. An electro-mechanical actuator as set forth in claim 8 and further comprising a magnetically-permeable space arranged between said magnets.

* * * * *

UNITED STATES PATENT AND TRADEMARK OFFICE

CERTIFICATE OF CORRECTION

PATENT NO. : Re. 34,870

DATED : Mar. 7, 1995

INVENTOR(S) : Franklin G. Miller

It is certified that error appears in the above-identified patent and that said Letters Patent is hereby corrected as shown below:

Title page, item [19] should read --Miller--

Title page, item [75], should read --Franklin G. Miller--

Signed and Sealed this

Thirtieth Day of January, 1996

Bruce Lehman

*Attest:*

BRUCE LEHMAN

*Attesting Officer*

*Commissioner of Patents and Trademarks*